April 21, 1959     J. L. HARNED ET AL     2,882,721
SIMULATED INERTIA WEIGHT SYSTEM Filed May 1, 1957     2 Sheets-Sheet 1

INVENTORS
John L. Harned,
Roy F. Knudsen &
Francis M. Ward
BY
L. D. Burch
ATTORNEY April 21, 1959     J. L. HARNED ET AL     2,882,721
SIMULATED INERTIA WEIGHT SYSTEM Filed May 1, 1957     2 Sheets-Sheet 2

INVENTORS
John L. Harned,
Roy F. Knudsen &
Francis M. Ward
BY
ATTORNEY

United States Patent Office 2,882,721
Patented Apr. 21, 1959

2,882,721

SIMULATED INERTIA WEIGHT SYSTEM

John L. Harned, Detroit, Roy F. Knudsen, Birmingham, and Francis M. Ward, Ferndale, Mich., assignors to General Motors Corporation, Detroit, Mich., a corporation of Delaware Application May 1, 1957, Serial No. 656,258

3 Claims. (Cl. 73—116)

The invention relates to a mechanism for simulating standard inertia weights to exert an opposing torque on the wheels of a vehicle or other mechanism being tested. The simulated inertia weights are to be exerted in proportion to acceleration of the vehicle.

The invention is especially applicable to a chassis dynamometer which is used to test an automotive vehicle under running load conditions. It provides an infinite selection of simulated inertia loads limited only by the range of the dynamometer. A mechanism embodying the invention is very flexible since the desired simulated values are obtained by merely adjusting the controls rather than through a laborious rearrangement, moving, and removal of standard inertia weights. Desired load curves may be readily matched since such a system can be quickly tuned to the desired curve. Furthermore, the cost of installing the electronically simulated inertia weight system is equal to four to five percent of the cost of installing actual inertia weights. The system also requires much less space than does a standard inertia weight installation.

The load imposed on an automotive vehicle power plant is the result of four components. These are static or starting friction on the moving parts, inertia forces developed during acceleration and deceleration, windage, and rolling friction. In the preferred form of the invention which is herein disclosed, the inertia forces developed during acceleration and deceleration are simulated. The principles involved, however, may also be utilized to simulate any or all of the other load components.

Standard inertia weights have commonly been used in the past to exert an opposing torque on the vehicle wheels which is proportional to acceleration. The use of a simulated inertia weight system involves the obtaining of a signal which is proportional to vehicle acceleration and applying an opposing torque to the vehicle wheels which is proportional to this acceleration signal. The inertia encountered by vehicle acceleration is thus simulated without the necessity of providing actual inertia weights. The system is equally applicable to deceleration conditions since deceleration may be expressed as negative acceleration.

When a rotating mass is accelerated, torque is equal to the moment of inertia multipled by the angular acceleration. Therefore, in order to simulate inertia weights, an opposing dynamometer torque which is proportional to acceleration must be developed.

Figure 2:
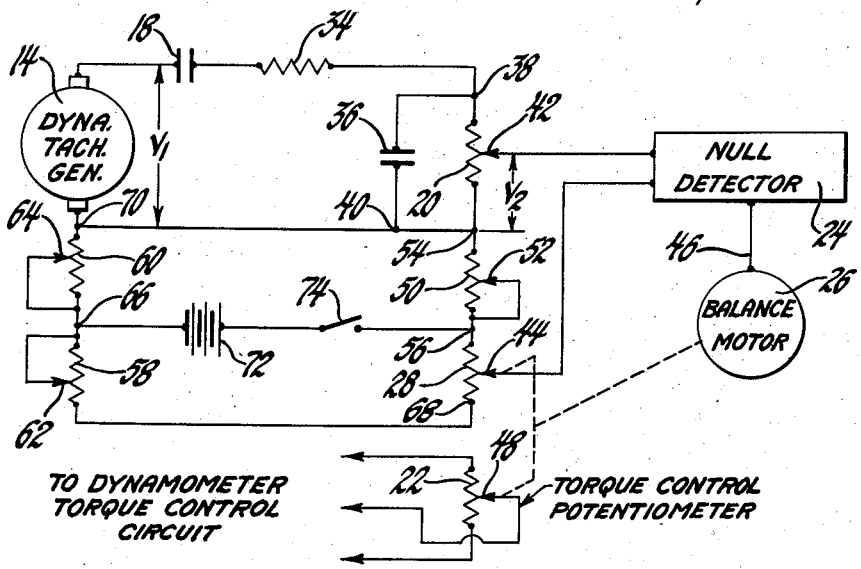
Figure 2 is a schematic diagram of the electronic control system which is a part of the system of Figure 1.

Vehicle 10 is positioned on the test dynamometer rolls so that its driving wheels are in driving contact with the rolls which in turn drive the dynamometer 12. Dynamometer 12 is controlled to provide a variable resistance to the rotation of the dynamometer rolls by the vehicle power plant through the vehicle driving wheels. A tachometer generator 14 may be driven by the dynamometer 12 and generates a voltage $V_1$ which is proportional to vehicle velocity. Voltage $V_1$ may be fed through a condenser-resistor network as is shown in Figure 2. This network includes a condenser 18 and a potentiometer 20. The output voltage $V_2$ from the condenser-resistor network is the differential of the input voltage $V_1$ with respect to time. Since voltage $V_1$ is proportional to dynamometer speed, which in turn is proportional to vehicle wheel speed, voltage $V_2$ is directly proportional to vehicle acceleration. The voltage signal $V_2$ is applied to the dynamometer as an opposing torque which will in turn be proportional to vehicle acceleration.

Figure 1:
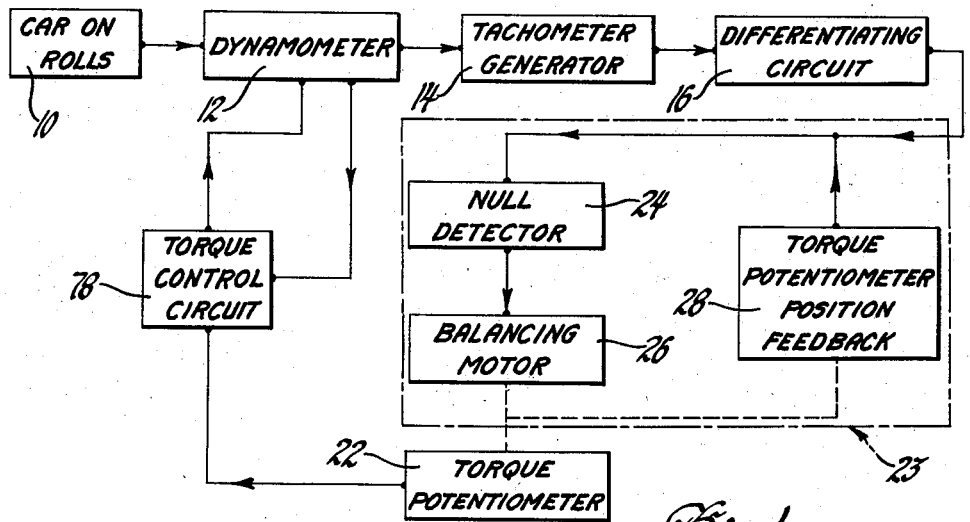
Figure 1 is a schematic diagram of a system embodying the invention and illustrates an electronic and servo system to position the dynamometer torque control.

Dynamometer torque is proportional to the shaft position of the torque control potentiometer 22. A servo amplifier 23 which positions the torque control in proportion to the acceleration signal voltage $V_2$ completes the system. This servo amplifier is illustrated in Figures 1 and 2. It may include a null detector 24, a balance motor 26 and a torque potentiometer position feedback 28. Since the dynamometer 12 must be able to exert torque in either direction, thereby simulating acceleration or deceleration, the torque control potentiometer 22 must be of the zero center type. Since the position feedback potentiometer 28 must follow the torque control potentiometer 22 exactly, potentiometer 28 must also be zero centered. A resistance 34 and a condenser 36 are provided to filter undesirable electrical noise. Resistance 34 is in series with condenser 18 and condenser 36 is connected into the differentiating circuit 16 at point 38 intermediate resistor 34 and potentiometer 20 and at point 40 intermediate potentiometer 20 and generator 14. The variable contact 42 of potentiometer 20 is connected to null detector 24. The variable contact 44 of potentiometer 28 is also connected with the null detector 24. Signals from the null detector 24 are transmitted to the balance motor 26 through leads 46. Balance motor 26 is mechanically connected to variable contact 44 of potentiometer 28 and to variable contact 48 of potentiometer 22. When the balance motor is moved, variable contacts 44 and 48 are moved proportionately. Variable resistor 50 with its variable contact 52 is connected at 54 with the differentiating circuit 16 and at 56 with the torque potentiometer position feedback circuit 28. Variable resistances 58 and 60 with their variable contacts 62 and 64 have a common junction at point 66 and are respectively connected at point 68 with resistance 32 and point 70 with one side of generator 14. These resistors permit approximate balancing of the system. A direct current electrical source such as battery 72 is provided intermediate points 56 and 66. Switch 74 may be provided to control energization of the torque potentiometer position feedback circuit by source 72.

During accelerations, the rate voltage $V_2$ between points 42 and 54 is positive and during deceleration this voltage is negative. When the dynamometer 12 and the vehicle 10 are accelerating, voltage $V_1$ is increasing and voltage $V_2$ appears across potentiometer 20. The position of the inertia selector, which controls the position of contact 42 on potentiometer 20, determines the portion of voltage $V_2$ used. The voltage across points 54 and 56 has been previously adjusted to be exactly equal and opposite the voltage across points 56 and 44 when there is no dynamometer acceleration. As a result, voltage $V_2$ appears across the null detector 24. This causes the balance motor 26 to be turned in a direction to drive contact 44 of potentiometer 28 until voltages across 52 and 54 and 44 and 56, when added together, are equal and opposite to voltage $V_2$. When this occurs, the balance motor 26 stops because the signal to the null detector becomes zero. In the meantime, since contacts 44 and 48 are driven on a common shaft, the torque control potentiometer 22 has also been adjusted. The dynamometer 12 is therefore called upon to supply a torque proportional to vehicle acceleration.

Figure 3:
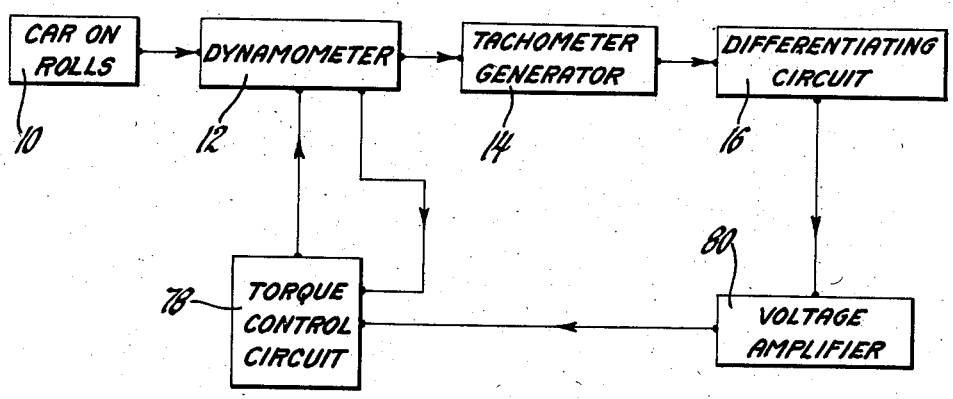
Figure 3 is a schematic diagram of a modification of the simulated inertia weight system of Figure 1.
Figure 4:
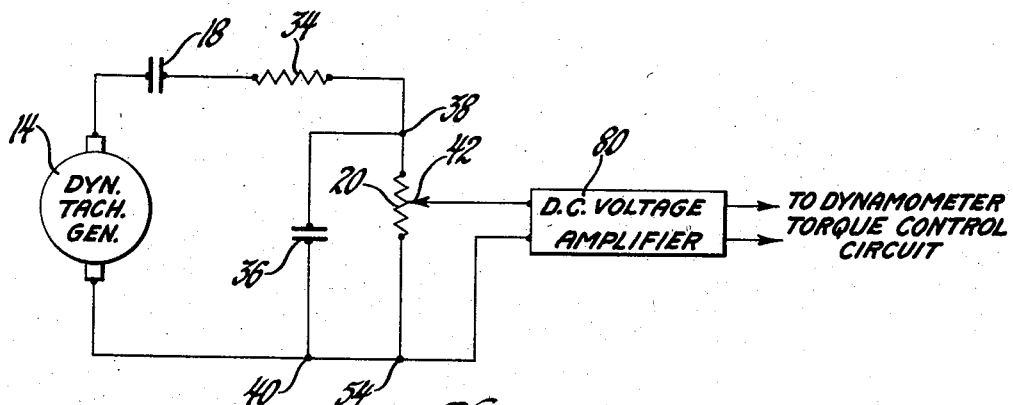
Figure 4 is a schematic diagram of the electronic system of Figure 3.

The modified system shown in Figures 3 and 4 amplifies voltage $V_2$ and feeds it directly into the dynamometer torque control circuit 78. Amplifier 80 thus replaces the servo amplifier 23 and the torque potentiometer 22 of the system of Figure 1.

A system for electronically simulating standard inertia weights has thus been provided which will impose torque on a dynamometer which is proportional to vehicle acceleration and deceleration loads. A voltage has been established which is proportional to vehicle acceleration and this voltage is applied through either a servo amplifier or a voltage amplifier to control dynamometer torque in accordance with vehicle acceleration. The desired simulated inertia load may be readily adjusted by changing the resistance setting of the torque control element 20. Changing the inertia is thus simplified and requires considerably less effort than changing actual weights.

We claim:

1. In combination with a dynamometer, a generator developing a signal corresponding to the angular velocity of said dynamometer, a differentiating circuit including an output resistor and a condenser connected in series across said generator to develop an acceleration voltage across said resistor, a servomechanism including an input circuit and a servo motor, a follow-up circuit including a voltage source and a feedback potentiometer energized by said voltage source, said servo input circuit being connected across said output resistor and said feedback potentiometer to differentially combine the voltages thereacross to derive an error voltage, said servo motor being drivingly connected with said feedback potentiometer to reduce said error voltage to a null value in response to change of said acceleration voltage, and a torque control potentiometer connected and driven by said servo motor to a position corresponding to the amplitude of said acceleration voltage, said output resistor having an adjustable tap whereby simulated inertia loads on said dynamometer may be selected.

2. In combination with a dynamometer, a generator developing a signal corresponding to the angular velocity of said dynamometer, a differentiating circuit including an output resistor and a condenser connected in series across said generator to develop an acceleration voltage across said resistor, a servomechanism including an input circuit and a servo motor, a rebalancing bridge circuit including a voltage source and a feedback potentiometer and a balancing potentiometer energized by said voltage source, said servo input circuit being connected across said output resistor and said feedback potentiometer and said balancing potentiometer to differentially combine the voltages thereacross to derive an error voltage, said balancing potentiometer being adjusted to an initial position whereby said error voltage is zero when said acceleration voltage is zero, said servo motor being drivingly connected with said feedback potentiometer to reduce said error voltage to a null value in response to change of said acceleration voltage, and a torque control potentiometer connected with and driven by said servo motor to a position corresponding to the amplitude of said acceleration voltage.

3. In combination with a dynamometer, a generator developing a signal corresponding to the angular velocity of said dynamometer, a differentiating circuit including an output resistor and a condenser connected in series across said generator to develop an acceleration voltage, a servomechanism including an input circuit and a servo motor, a rebalancing bridge circuit including a voltage source connected between one pair of terminals of said bridge circuit and a feedback potentiometer and a balancing potentiometer connected in conjugate arms of said bridge circuit and energized by said voltage source, said servo input circuit being connected across said output resistor, said feedback potentiometer, and said balancing potentiometer to differentially combine the voltages thereacross to derive an error voltage, said balancing potentiometer being adjusted to an initial position whereby the error voltage is zero when said acceleration voltage is zero, said servo motor being drivingly connected with said feedback potentiometer to reduce said error voltage to a null value in response to a change of said acceleration voltage, and a torque control potentiometer connected with and driven by said servo motor to a position corresponding to the amplitude of said acceleration voltage.

References Cited in the file of this patent

UNITED STATES PATENTS

| | | |
|---|---|---|
| 2,414,356 | Bogen et al. | Jan. 14, 1947 |
| 2,685,199 | Wilson et al. | Aug. 3, 1954 |